US012674401B2

(12) United States Patent
Frassinelli et al.

(10) Patent No.: US 12,674,401 B2

(45) Date of Patent: Jul. 7, 2026

(54) CONSTRUCTING A TURBOMACHINERY INSTALLATION FOR ASSEMBLY ONSHORE AND INSTALLATION ON AN OFFSHORE PLATFORM

(71) Applicant: NUOVO PIGNONE TECNOLOGIE—SRL, Florence (IT)

(72) Inventors: Luca Frassinelli, Florence (IT); Andrea Magarotto, Florence (IT); Venkata Rambabu Dabiru, Florence (IT); Elena Tani, Florence (IT)

(73) Assignee: Nuovo Pignone Tecnologie—S.R.L, Florence (IT)

( * ) Notice: Subject to any disclaimer, the term of this patent is extended or adjusted under 35 U.S.C. 154(b) by 178 days.

(21) Appl. No.: 18/546,351

(22) PCT Filed: Feb. 15, 2022

(86) PCT No.: PCT/EP2022/025051

§ 371 (c)(1),
(2) Date: Aug. 14, 2023

(87) PCT Pub. No.: WO2022/171366

PCT Pub. Date: Aug. 18, 2022

(65) Prior Publication Data

US 2024/0117757 A1 Apr. 11, 2024

(30) Foreign Application Priority Data

Feb. 15, 2021 (IT) ........................ 102021000003356

(51) Int. Cl.

*F01D 25/28* (2006.01)
*F01D 15/08* (2006.01)
*F01D 15/10* (2006.01)

(52) U.S. Cl.

CPC ............ *F01D 25/28* (2013.01); *F01D 15/08* (2013.01); *F01D 15/10* (2013.01); *F05D 2230/60* (2013.01)

(58) Field of Classification Search

None

See application file for complete search history.

(56) References Cited

U.S. PATENT DOCUMENTS

| | | | | |
|---|---|---|---|---|
| 1,083,947 | A * | 1/1914 | Schaal | F24C 5/06 126/45 |
| 2002/0197147 | A1 | 12/2002 | Kawai et al. | |
| 2007/0131839 | A1 | 6/2007 | Dunn et al. | |
| 2013/0213001 | A1 | 8/2013 | Eickelkamp et al. | |

(Continued)

FOREIGN PATENT DOCUMENTS

| | | | |
|---|---|---|---|
| CN | 209 819 058 | U | 12/2019 |
| JP | S5824699 | A | 2/1983 |

(Continued)

*Primary Examiner* — Phutthiwat Wongwian

*Assistant Examiner* — Jacek Lisowski

(74) *Attorney, Agent, or Firm* — Paul Frank + Collins P.C.

(57) ABSTRACT

A turbomachinery installation for an offshore platform is disclosed. The turbomachinery installation comprises a train system having at least one preassembled power module, and a torque tube baseplate, on which the train system is installed. A supporting baseplate of the power module is coupled with the torque tube baseplate. Also disclosed is a method of assembling a turbomachinery installation.

19 Claims, 5 Drawing Sheets

(56) References Cited

U.S. PATENT DOCUMENTS

| | | | |
|---|---|---|---|
| 2015/0184591 | A1 | 7/2015 | Giancotti et al. |
| 2016/0102581 | A1 | 4/2016 | Del Bono |
| 2016/0305270 | A1 | 10/2016 | Marcucci et al. |
| 2018/0186442 | A1 | 7/2018 | Maier |
| 2020/0124363 | A1* | 4/2020 | Ueda ..................... F28F 27/006 |
| 2020/0189049 | A1* | 6/2020 | Dzieciol ................... B66F 7/28 |

FOREIGN PATENT DOCUMENTS

| | | | |
|---|---|---|---|
| JP | S60247012 | A | 12/1985 |
| JP | 2002364309 | A | 12/2002 |
| JP | 2016520753 | A | 7/2016 |
| JP | 2017502192 | A | 1/2017 |
| KR | 20110052906 | A | 5/2011 |
| KR | 2012 0070109 | A | 6/2012 |
| KR | 2013 0066252 | A | 6/2013 |
| KR | 20150023681 | A | 6/2013 |
| KR | 20160093070 | A | 8/2016 |

* cited by examiner

CONSTRUCTING A TURBOMACHINERY INSTALLATION FOR ASSEMBLY ONSHORE AND INSTALLATION ON AN OFFSHORE PLATFORM

TECHNICAL FIELD

The present disclosure concerns a turbomachinery installation comprising a train system comprising, for instance, a gas turbine, and an electric generator driven machine or a compressor and a torque tube baseplate, or a supporting structure in general, for supporting the train system.

Background Art

A gas turbine is a combustion engine that can convert natural gas or other liquid fuels to mechanical energy. A gas turbine can be installed either in onshore as well as offshore platforms, to drive a generator, in order to produce electrical energy, for instance. In general, a gas turbine is part of so-called train plants or train systems, which comprise the gas turbine itself, as a power source, transmission equipment, which can include a load gear, and a load to be driven. As mentioned, the load can be for instance an electric generator driven machine, capable of generating electrical current while driven, a compressor, or a pump.

Hereafter, for ease of reference only, a system comprising a power source, transmission equipment, and a load, e.g., a compressor, may be referred to as a "train", a "train system" or a "train plant".

Each train system provides for a skid, comprising an enclosure of the gas turbine and, if present, the load gear.

When the train system has to be installed onshore, the skid is installed on a baseplate, to be in its turn fixed to a concrete foundation block. In this way, a module comprising the gas turbine, the possible transmission equipment, and the enclosure, including the latter the baseplate, can be assembled at the factory and then transported directly to the installation site.

In offshore turbomachinery installations, the train system usually comprises a generator to produce electrical energy for any possible necessity at the offshore platform, for example. The turbomachinery installation thus comprises the train systems and support bases, called baseplates, which can be a torque tube baseplate, which are installed on the offshore platforms.

Usually, the train systems and the baseplates, which form the turbomachinery installation, are designed and realized by different subjects or operator, or, in general, in different factories. Therefore, it is usually necessary to install all the different parts of the train system in a factory over the torque tube baseplate, transporting the different parts to the offshore platform, and connecting the auxiliary skids to the train system by means of pipes and cables directly on the installation yard (offshore platform). This requires a long installation time and technical adaptations.

Therefore, a gas turbine has to be installed, enclosed and packaged directly on the torque tube baseplate. Also, all the other equipment required for the train system to operate has to be installed over the torque tube baseplate, so that it is difficult to use standardized gas turbine packages.

These approaches negatively affect the design and production costs as well as the installation and commissioning time required for the gas turbines offshore erections.

SUMMARY

In one aspect, the subject matter disclosed herein is directed to a turbomachinery installation for an offshore platform. The turbomachinery installation comprises a train system made of a power module and a torque tube baseplate, on which the train system is installed. The train system has a gas turbine or power source and a load, driven by the gas turbine. The power source is enclosed by an enclosing structure. The power module comprises also a supporting baseplate, which is coupled to the power source and to the enclosing structure and is arranged between the power module and the torque tube baseplate, by coupling members.

In another aspect, the subject matter disclosed herein concerns that the auxiliary equipment, necessary for the operation of the train system, installed below the supporting baseplate, so as to reduce the total footprint of the installation, and coupled to the torque tube baseplate. Also, the coupling members are arranged between the supporting baseplate and the torque tube baseplate.

In another aspect, disclosed herein is that the torque tube baseplate comprises a main beam and a plurality of transversal beams, arranged perpendicular to the main beam. The coupling members are connected to the transversal beams of the torque tube baseplate, and are arranged between the torque tube baseplate and the supporting baseplate, to adjust the distance between the torque tube baseplate and the supporting baseplate.

In another aspect, disclosed herein is that the torque tube baseplate comprises a tank for collecting the bearing lube oil of the power source. The tank can be integrated into the torque tube baseplate or it can be housed in a housing portion obtained in the torque tube baseplate.

In another aspect, disclosed herein is that the tank may comprise two sub-tanks coupled to the main beam of the torque tube baseplate.

In another aspect, disclosed herein is that coupling members are jacking screws, each provided with respective spherical support.

In another aspect, disclosed herein is that the turbomachinery installation comprises spherical joints or anti-vibration mounts arranged below the torque tube baseplate, to compensate for the deformability of the offshore platform.

A further aspect of the present disclosure is drawn to the fact that the power module is preassembled.

In another aspect, the subject matter disclosed herein is directed to a method of assembling a turbomachinery installation, where the installation of the auxiliary equipment to a torque tube baseplate is carried out. Then the load is installed on the torque tube baseplate. Finally, the supporting baseplate of the power module is coupled on the torque tube baseplate, by means of one or more coupling members.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Gas turbines are often installed on offshore platforms, to drive electric generators and to supply electrical energy to the equipment of the offshore platforms themselves. To install the gas turbine and the electric generator, a large number of parts and components are required, which have to be transported and assembled directly on the offshore platforms. The present subject matter is directed to an assembly or installation, which allows preassembling a power module, comprising the gas turbine, and the baseplate along with any relevant auxiliary equipment for the operation of the gas turbine, so that the assembly can be transported on the offshore platform already assembled. In this way, the assembly can be directly installed on an offshore platform.

Figure 1:
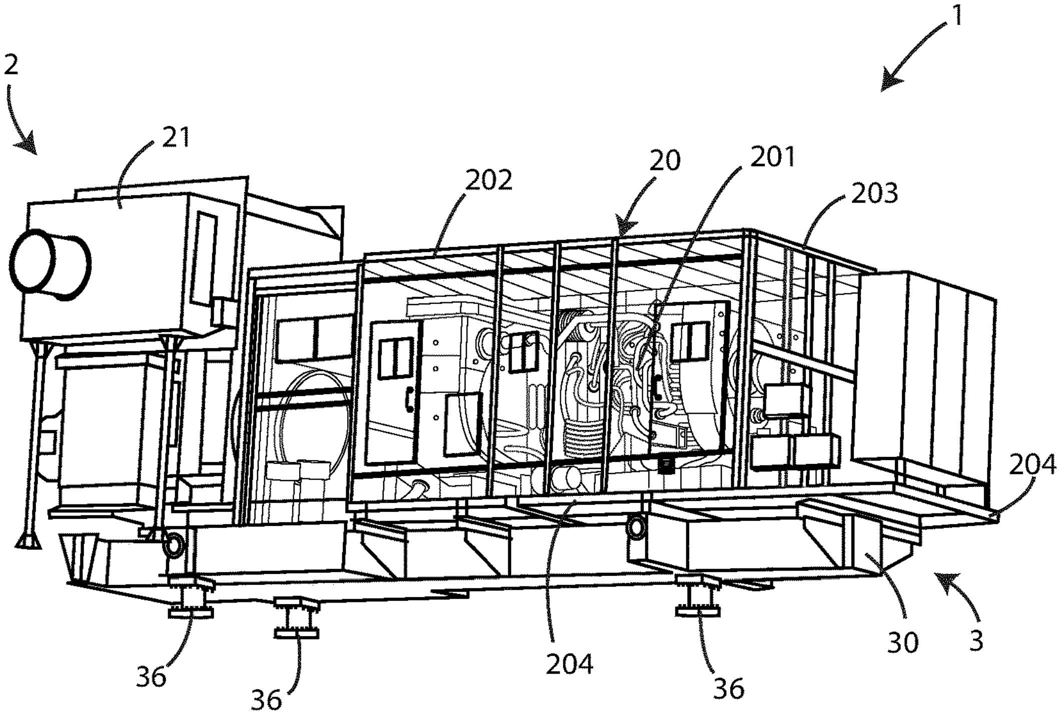
FIG. 1 illustrates a schematic of a perspective view of an offshore platform, wherein a train system is installed on a torque tube baseplate according to a first embodiment.

Referring now to the drawings, FIG. 1 shows a turbomachinery installation, indicated with reference number 1, to be installed on an offshore platform (the offshore platform is not shown in the figures), which comprises a train plant or train system 2, and a torque tube baseplate 3, on which the train system 2 is coupled.

The train system 2 comprises a power module or gas turbine module 20, and a load 21, which is connected to the power module 20, as better specified below.

The power module 20 comprises a power source 201, such as a gas turbine, a steam turbine, and the like, and possibly a transmission equipment 202, such as an epicyclical gear, to allow the transmission of the power generated by the power source 201 to a load, by a transmission shaft (not shown in the figure). However, also other transmission equipment 202 may be implemented. In some embodiments, the power module 20 may be not even equipped with transmission equipment 202.

The power module 20 also includes an enclosing structure 203 and a supporting baseplate 204, also called in the field slim baseplate, in view of its reduced weight and size if compared to the torque tube baseplate 3, on which the enclosing structure 203 is arranged. The enclosing structure and the supporting baseplate 204 envelopes the power source 201, and the transmission equipment 202. The power source 201 and the transmission equipment 202 are both fixed on the supporting baseplate 204 and arranged within the enclosing structure 203. The enclosing structure 203 is also opened on one side, to allow the power coupling of the load 21 to the power source 201, possibly through the transmission equipment 202.

As shown in FIG. 1, the supporting baseplate 204 is arranged between the train system 2 and the torque tube baseplate 3, in particular between the gas turbine module 20 and the torque tube baseplate 3, for supporting the gas turbine module 20.

In onshore installations the supporting baseplate 204 may be fixed directly to the concrete; while, in offshore installations, the supporting baseplate 204 can be coupled to the torque tube baseplate 3, as better described below. Therefore, the power module 20 can be indifferently installed in an onshore, as well as in an offshore installation.

Also referring to FIGS. 2A, 2B, 2C, and FIG. 3 the torque tube baseplate 3 is illustrated in detail. Specifically, the torque tube baseplate 3 comprises a main beam 30, which develops along a direction parallel or substantially parallel to an axis X of the Cartesian reference system XYZ (shown in FIGS. 1, 2A, 2B, and 3), and a plurality of transversal beams 31, 32, 33, each one of which develops along a direction perpendicular to the direction of the main beam 30, i.e., parallel or substantially parallel to an axis Y of the same Cartesian reference system XYZ mentioned above. The torque tube baseplate 3, then, has a fishbone shape.

According to the present disclosure, the main beam 30 is a squared torque tube beam, i.e., it has an almost squared cross-section, with a respective height. The main beam 30 may be a single member or obtained by welding open section beams and plates together.

The transversal beams, namely a front 31, an intermediate 32, and a rear 33 transversal beam may have different heights compared to each other and compared to the main beam 30. In some embodiments, the transversal beams 31, 32, and 33 may have the same height as the main beam 30.

One or more of the transversal beams 31, 32, 33 have a different height to ease the passage of pipes and the installation of tools, as better specified below.

Figure 2A:
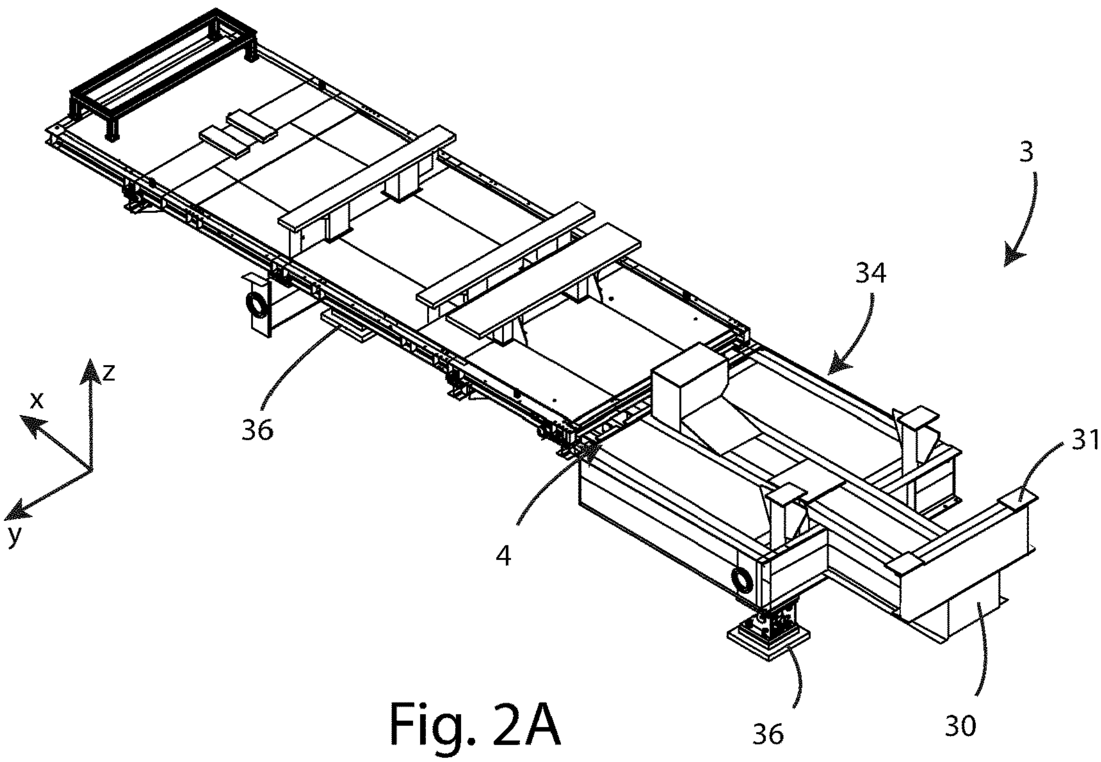
FIG. 2A illustrates a perspective view from the top of the torque tube baseplate of FIG. 1.
Figure 2B:
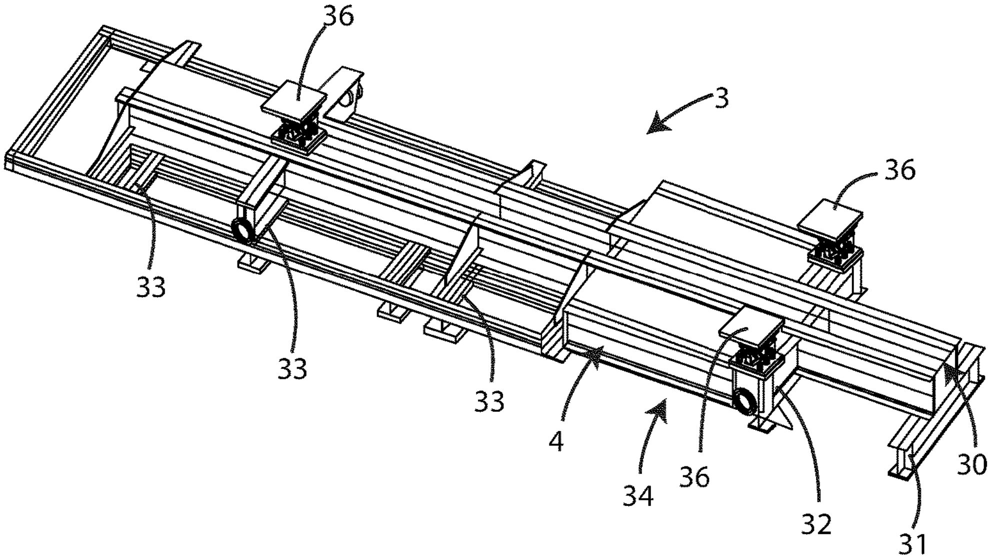
FIG. 2B illustrates a perspective view from the bottom of the torque tube baseplate of FIG. 1.
Figure 2C:
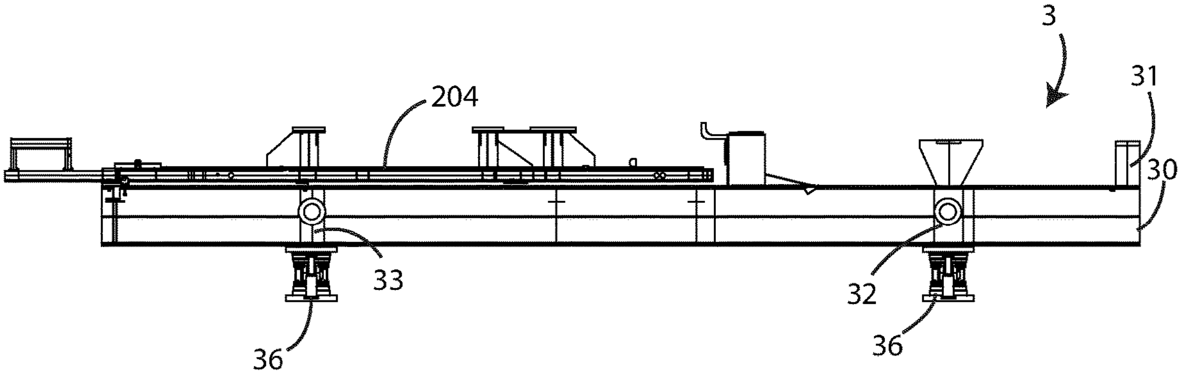
FIG. 2C illustrates a side view of the torque tube baseplate of FIG. 1.

In the embodiment illustrated in FIGS. 1, 2A, and 2B, the intermediate transversal beam 32 has the same height as the main beam 30, and it supports a first side or Driven End (DE) side of the load 21, wherein there is a connection flange (not shown in the figures) between the power source 201, and load 21. Instead, the front transversal beam 31 supports a second side or Non-Driven End (NDE) side of the load 21. The transversal beams 33 support the supporting baseplate 204 of the power unit 20. In the present disclosure, each rear transversal beam 33 is welded to the first beam 30. However, in some other embodiments, the transversal beams 33 can also be only connected to the first beam 30 by mechanical means.

Moreover, the torque tube baseplate 3 comprises a housing portion 34, and a tank 4, housed in the housing portion 34. The tank 4 is intended to collect the bearing lube oil of the power source 201, to be filtered and cooled, so as to be reused or reintroduced into the power source 201 itself.

Figure 4:
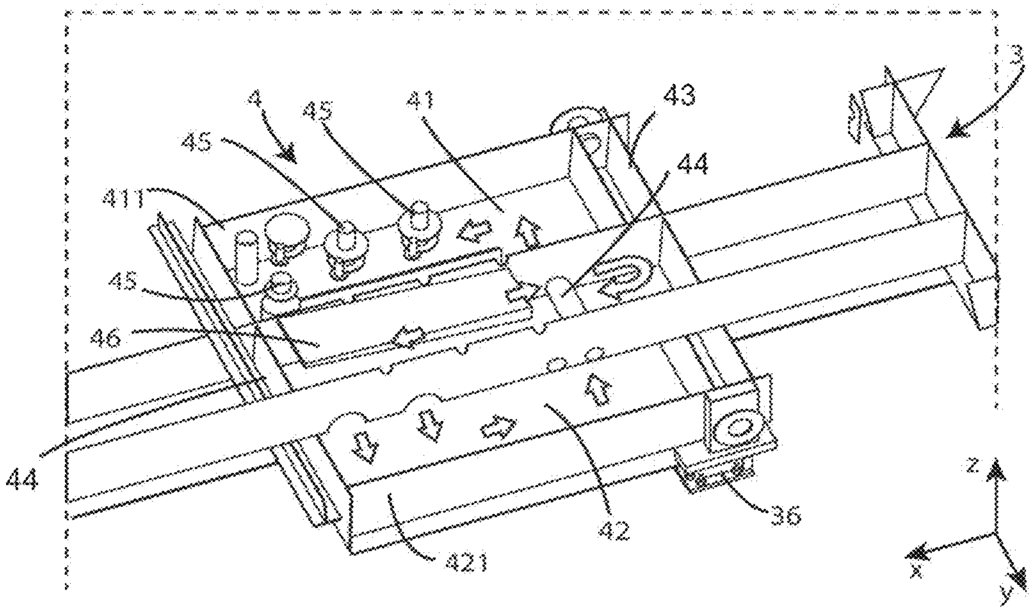
FIG. 4 illustrates a detail of the torque tube baseplate of FIG. 2A.

As shown in FIG. 2A-2B, and FIG. 4, the housing portion 34 is shaped for housing the tank 4, allowing the arrangement of the tank 4 below the power source 201 close to the load 21. In the embodiment illustrated, the tank 4, and then the housing portion 34, is parallelepiped shaped. In particular, in the present disclosure, the tank 4 is integrated into the housing portion 34.

In other embodiments, the tank 4 may be placed in other positions with respect to load 21. Also, in some other embodiments, the tank 4 can comprise two external subtanks 41 and 42. The main beam 30 is arranged between the sub-tanks 41 and 42. In such embodiments, the two subtanks 41 and 42 can be coupled by welding to the main beam 30.

More specifically, the sub-tanks 41 is defined by a lateral plate 411 and part of transversal plates 43, while the subtank 42 is defined by the relevant lateral plate 421 and part of transversal plates 43. The transversal plates cross the main beam 30. The tank 4 also comprises one or more pipes 44 for recirculation, which connects the subtanks 41 and 42. Also, the tank 4 comprises some pumps 45, for pumping the oil within the tank 4, and for recirculating the oil contained, in accordance with the arrows shown in FIG. 4. The tank 4 may also house a degassing tray 46, for degassing the oil of any undesired solved gas.

In particular, the configuration of the mineral lube oil tank 4 allows long fluid path from tank inlet to pumps suction. Moreover, in the present disclosure, the intermediate transversal beam 32 is part of the boundary that creates the integrated mineral lube oil tank 4.

Figure 3:
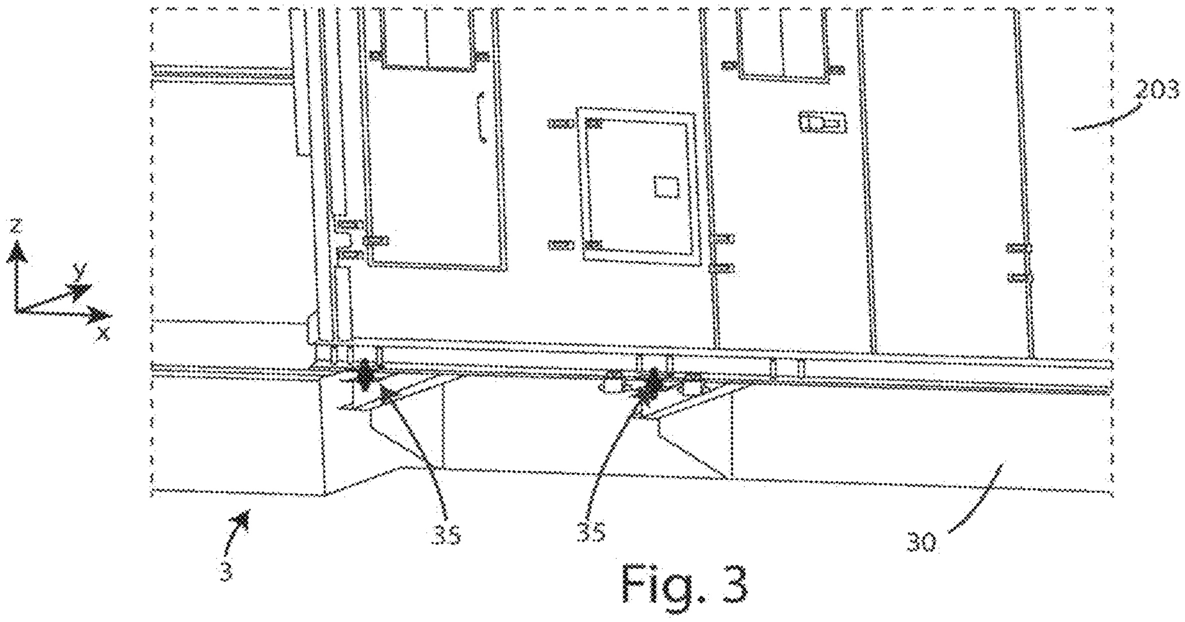
FIG. 3 illustrates a detail of the coupling between the torque tube baseplate and a slim baseplate.

Referring also to FIG. 3, the turbomachinery installation 1 also comprises coupling members 35, arranged between the torque tube baseplate 3 and the supporting baseplate 204, in particular, connected to the rear transversal beams 33 of the torque tube baseplate 3 and the supporting baseplate 204. In other embodiments, the coupling members 35 may be located in other positions, depending on the weight to be supported.

According to the present disclosure, each of the coupling members 35 may be a jacking screw, provided with respective spherical support or washer. The coupling members 35, are capable of ensuring complete contact between the torque tube baseplate 3 and the supporting baseplate 204, following the deformation of the deck of the offshore platform wherein the torque tube baseplate 3 is installed.

In particular, the coupling members 35 are adjustable along a direction perpendicular to the direction of the main beam 30 and the direction of the transversal beams 31, 32, 33, i.e., parallel or substantially parallel to the Z-axis of the Cartesian reference system XYZ (shown in FIGS. 1, 2A, 2B, and 3). The coupling members 35 allow the adjustment of the coupling between the torque tube baseplate 3 and the supporting baseplate 204.

The torque tube baseplate 3 also comprises spherical joints or gimbals 36, arranged underneath the torque tube the baseplate 3, in particular underneath the main beam 30 and/or to the housing portion 34 of the torque tube baseplate 3. The spherical joints 36 are capable of offsetting the deformability of the planes of the offshore platform. The spherical joints 36 connect the torque tube the baseplate 3 to the offshore platform.

With reference to FIG. 1 and FIG. 2A-2B, the torque tube baseplate 3 specifically comprises three spherical joints 36. In particular, two spherical joints 36 are arranged in correspondence with the transversal beam 31, while an additional spherical joint 36 is arranged in correspondence with a transversal beam 33, in the opposite side of the torque tube baseplate 3, so that on which the load 21 is located.

However, in other embodiments of the present disclosure, the torque tube baseplate 3 can be provided with a different number of spherical joints 36 as well as located in other positions.

Furthermore, referring to the schematic of FIG. 1 described so far, the load 21 is an electric generator driven machine, which is capable of generating electrical current while driven. The electric generator driven machine 21 is adapted to generate electric current when activated by the power source 22, to feed the offshore platform, for instance. In other embodiments, such load 21 can be a compressor or a pump, depending on the necessities.

Figure 5:
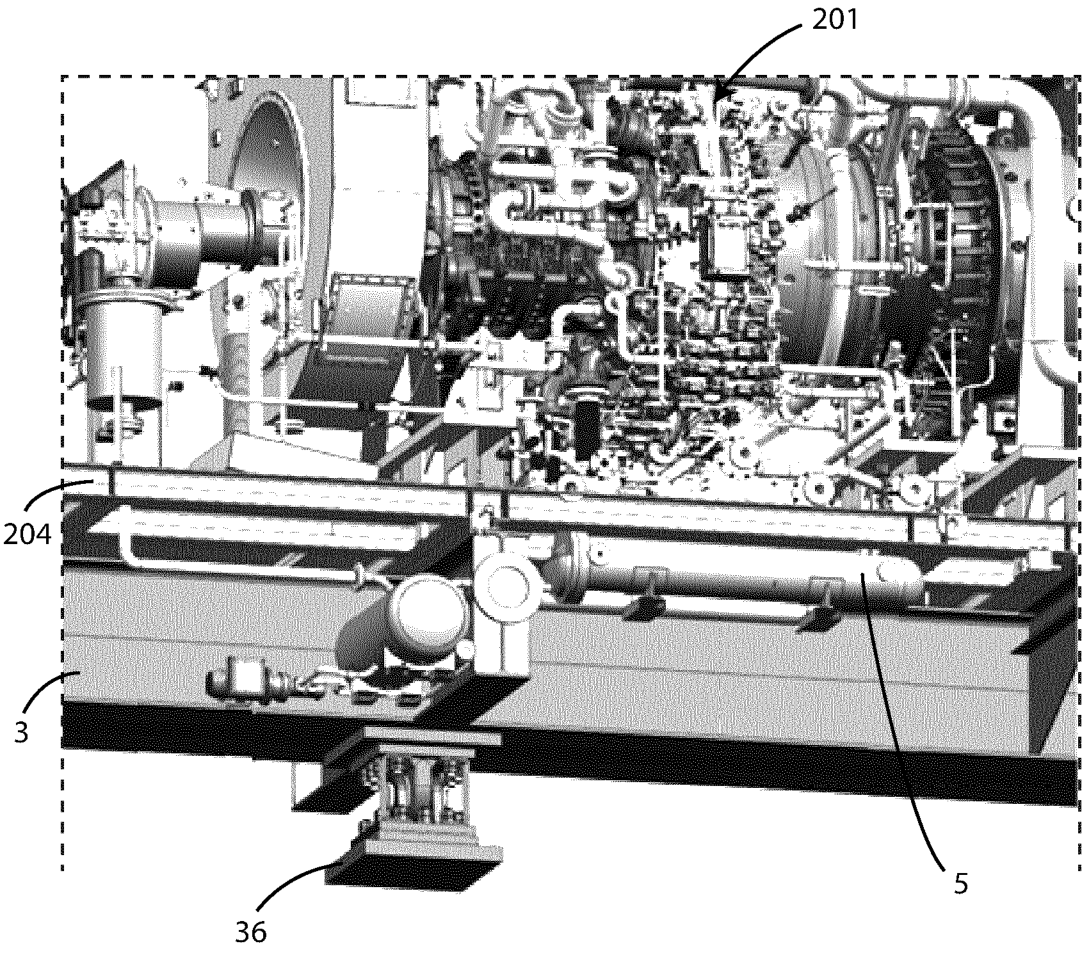
FIG. 5 illustrates a detail of the train system with electric generator driven machine of FIG. 1.

With reference to FIG. 5, in some embodiments, the torque tube baseplate 3 comprises auxiliary equipment 5 such as, for instance, a fuel oil pump, a liquid fuel damping bottle, a single cooler for back-purge, a lube oil cooler and a back-purge tank. In particular, liquid fuel booster and back-purge equipment can be installed in the free space underneath the supporting baseplate 204 and/or between the transversal beams 31, 32, 33 of the torque tube baseplate 3.

The turbomachinery installation 1 can be installed as follows.

The turbomachinery installation 1 can be preassembled, installing the power module 20 and the torque tube baseplate 3, so that it can transported on the offshore platform.

Figure 6:
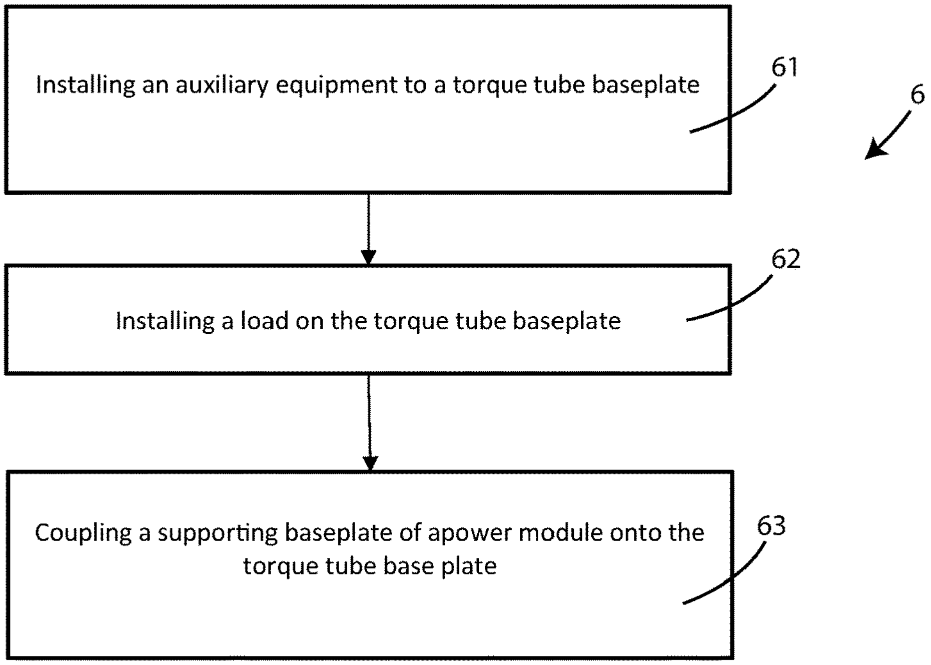
FIG. 6 illustrates a flowchart of a method for coupling the torque tube baseplate and the slim baseplate, according to a first embodiment.

More specifically, referring to FIG. 6, a method 6 of assembling the turbomachinery installation 1 is illustrated. The method 6 has a first step of installing 61 the auxiliary equipment 5 on the torque tube baseplate 3.

Then, the load 21 is installed (step 62) on the torque tube baseplate 3.

On a subsequent step 63, the supporting baseplate 204 of the enclosing structure 203 of the power module 20 is coupled on the torque tube baseplate 3, by means of one or more coupling members 35.

Figure 7:
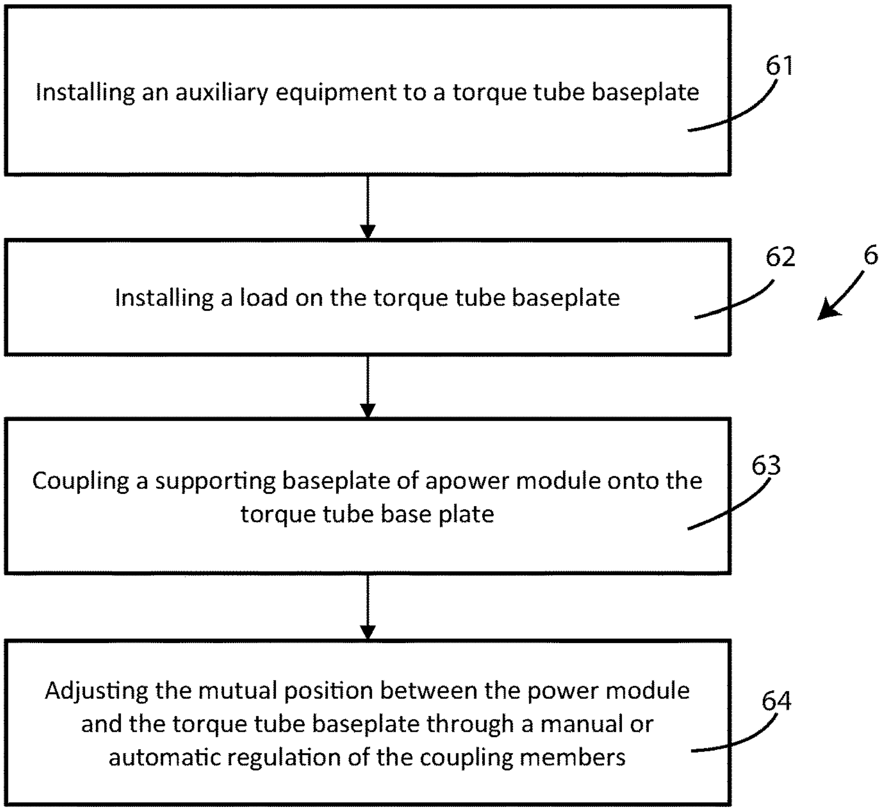
FIG. 7 illustrates a flowchart of a method for coupling the torque tube baseplate and the slim baseplate, according to a second embodiment.

Then, (see also FIG. 7) the step of adjusting 64 the mutual position between the power module 20 and the torque tube baseplate 3 through a manual or automatic regulation of the coupling members 35 is carried out.

An advantage of the present disclosure is that the gas turbine unit remains the same for onshore and offshore installations providing benefits for continuous flux production.

Another advantage of the present disclosure is that, thanks to the preinstallation of the auxiliary equipment on the torque tube baseplate, below the supporting baseplate, the installation of the turbomachinery system is faster.

A further advantage of the present disclosure is that the overall footprint is reduced (no liquid fuel booster and back-purge skids) and both left (LH) and right (RH) engine removal is possible with the same gas turbine unit.

Another advantage of the present disclosure is the weight reduction through lighter baseplate compared to traditional single lift baseplates and liquid fuel booster and back-purge baseplates.

A further advantage of the present invention is that that some items can be installed below the supporting baseplate between the beams instead of being installed elsewhere, allowing the design of a baseplate with a more compact layout.

While aspects of the invention have been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to “one embodiment” or “an embodiment” or “some embodiments” means that the particular feature, structure or characteristic described in connection with an embodiment is included in at least one embodiment of the subject matter disclosed. Thus, the appearance of the phrase “in one embodiment” or “in an embodiment” or “in some embodiments” in various places throughout the specification is not necessarily referring to the same embodiment(s). Further, the particular features, structures or characteristics may be combined in any suitable manner in one or more embodiments.

When elements of various embodiments are introduced, the articles “a”, “an”, “the”, and “said” are intended to mean that there are one or more of the elements. The terms “comprising”, “including”, and “having” are intended to be inclusive and mean that there may be additional elements other than the listed elements.

The invention claimed is:

1. A turbomachinery installation for an offshore platform, comprising:
- a train system including a power module, comprising:
  - a power source for supplying energy to the turbomachinery installation,
  - an enclosing structure that encloses the power source, and
  - a supporting baseplate coupled to the enclosing structure and the power source;
- a load driven by the power module;
- a torque tube baseplate on which the train system is installed, the torque tube baseplate comprising a main beam and transverse beams disposed perpendicular to the main beam; and
- coupling members for coupling the supporting baseplate and the torque tube baseplate,
- wherein at least one of the transverse beams is set at a height that is different than any other transverse beams, and
- wherein the supporting baseplate is arranged between the power module and the torque tube baseplate.

2. The turbomachinery installation according to claim 1, wherein the power module comprises auxiliary equipment that is installed below the supporting baseplate and coupled to the torque tube baseplate.

3. The turbomachinery installation according to claim 1, wherein the power module comprises auxiliary equipment selected from a fuel oil pump, a liquid fuel damping bottle, a single cooler for back-purge, a back-purge tank, heat exchangers, gears, or pipes.

4. The turbomachinery installation according to claim 1, wherein the coupling members are arranged between the supporting baseplate and the torque tube baseplate.

5. The turbomachinery installation according to claim 1, wherein the coupling members are connected to the transversal beams and are arranged between the torque tube baseplate and the supporting baseplate, and wherein the coupling members are adjustable along the direction of an axis perpendicular to the direction of the main beam and the direction of the transversal beams.

6. The turbomachinery installation according to claim 1, further comprising:
- a tank for collecting a bearing lube oil of the power source.

7. The turbomachinery installation according to claim 1, further comprising:
- a tank for collecting a bearing lube oil of the power source,
- wherein the torque tube baseplate comprises a housing portion shaped for housing the tank, and
- wherein the housing portion is arranged below the power source close to the load.

8. The turbomachinery installation according to claim 1, further comprising:
- a tank for collecting a bearing lube oil of the power source,
- wherein the torque tube baseplate forms the tank, and
- wherein the tank is integrated in the transversal beams.

9. The turbomachinery installation according to claim 1, further comprising:
- a tank for collecting a bearing lube oil of the power source,
- wherein the tank comprises two sub-tanks coupled to the main beam, and
- wherein the main beam of the torque tube baseplate is arranged between the two sub-tanks.

10. The turbomachinery installation according to claim 1, further comprising:
- a tank for collecting a bearing lube oil of the power source, the tank comprising two sub-tanks;
- pipes; and
- pumps,
- wherein each sub-tank is defined by a lateral plate and part of transversal plates,
- wherein the transversal plates cross the main beam, and
- wherein pipes connect the sub-tanks and the pumps for pumping the oil within the tank.

11. The turbomachinery installation according to claim 1, wherein the coupling members comprise jacking screws provided with respective spherical support.

12. The turbomachinery installation according to claim 1, further comprising:
- spherical joints arranged underneath the torque tube baseplate and adapted to compensate for a deformability of the offshore platform.

13. The turbomachinery installation according to claim 1, wherein the power module is preassembled.

14. The turbomachinery installation according to claim 1, wherein the load comprises a compressor or a pump.

15. A method of assembling a turbomachinery installation, comprising:
- installing an auxiliary equipment to a torque tube baseplate;
- installing a load on the torque tube baseplate; and,
- coupling a supporting baseplate of an enclosing structure of a power module onto the torque tube baseplate by means of one or more coupling members,
- wherein the power module comprises a gas turbine;
- wherein the torque tube baseplate comprising a main beam and transverse beams disposed perpendicular to the main beam; and
- wherein at least one of the transverse beams is set at a height that is different than any other transverse beams.

16. The method according to claim 15, further comprising:
- adjusting a mutual position between the power module and the torque tube baseplate through a manual or automatic regulation of the coupling members.

17. The method according to claim 15, wherein the coupling members comprise jacking screws provided with respective spherical support or washer.

18. The method according to claim 15, wherein the coupling members are placed between the torque tube baseplate and the supporting baseplate.

19. The method according to claim 15, further comprising:
- connecting the load to the power source.

* * * * *